(12) United States Patent
Sasakura et al.

(10) Patent No.: US 9,085,412 B1
(45) Date of Patent: Jul. 21, 2015

(54) UNDERGROUND STORAGE HEATING AND COOLING (USHC) SYSTEM

(76) Inventors: Russell J. Sasakura, Littleton, CO (US); Donald O. Summers, Morrison, CO (US)

( * ) Notice: Subject to any disclaimer, the term of this patent is extended or adjusted under 35 U.S.C. 154(b) by 523 days.

(21) Appl. No.: 13/364,958

(22) Filed: Feb. 2, 2012

Related U.S. Application Data

(60) Provisional application No. 61/438,821, filed on Feb. 2, 2011.

(51) Int. Cl.
*B65G 5/00* (2006.01)

(52) U.S. Cl.
CPC ........................................ *B65G 5/00* (2013.01)

(58) Field of Classification Search
USPC ................................... 405/52, 53, 55, 56, 57
See application file for complete search history.

(56) References Cited

U.S. PATENT DOCUMENTS

| | | | |
|---|---|---|---|
| 6,840,710 B2 * | 1/2005 | Peters et al. | 405/57 |
| 7,972,080 B2 * | 7/2011 | Summers et al. | 405/53 |
| 8,074,670 B2 * | 12/2011 | Peters et al. | 137/1 |
| 2005/0186030 A1 * | 8/2005 | Peters et al. | 405/53 |

* cited by examiner

*Primary Examiner* — Sunil Singh
(74) *Attorney, Agent, or Firm* — Scott L. Terrell, P.C.; Scott L. Terrell

(57) ABSTRACT

This disclosure describes systems and methods for the underground storage of heated or cooled fluid in order to preserve the temperature of the fluid. The systems described herein utilize one or more porosity storage reservoirs for heated or cooled fluid storage, in effect creating cold and or heat reservoirs in the subsurface. The reservoirs are hydrologically separated from the surrounding natural groundwater regime and, at least in part, thermally insulated from the natural environment by the walls creating the underground reservoirs. The walls may be actively or passively heated or cooled to provide better performance.

8 Claims, 9 Drawing Sheets

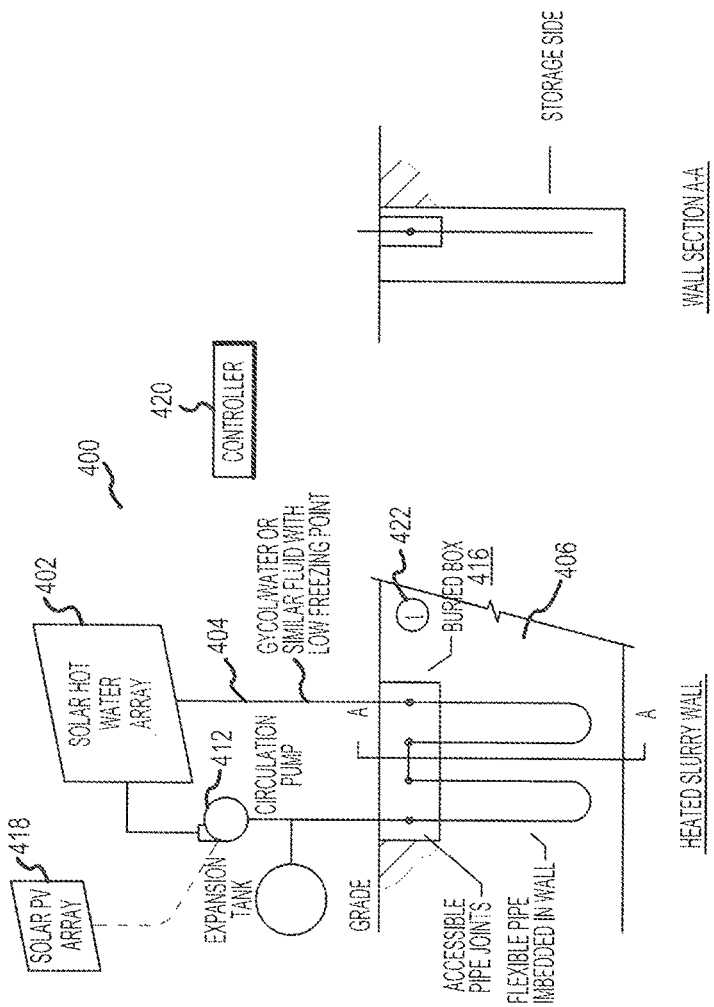

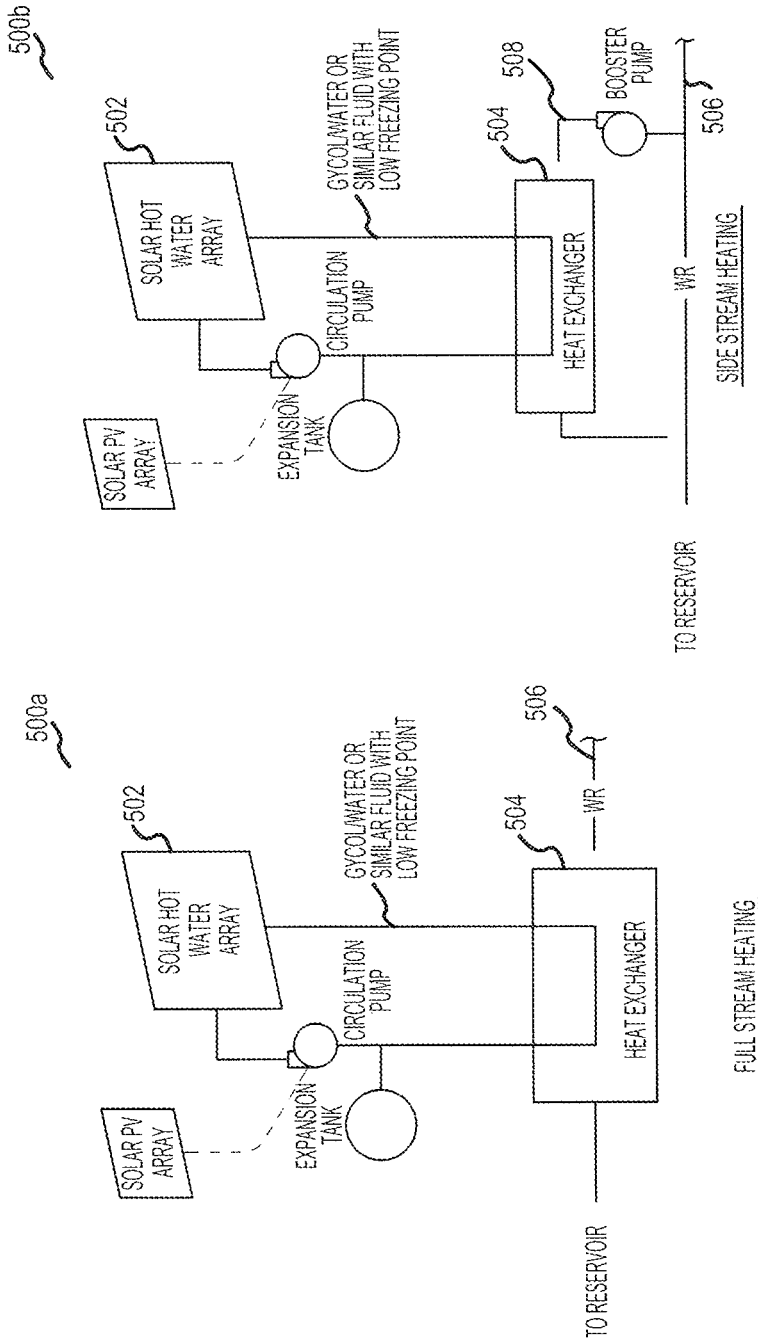

UNDERGROUND STORAGE HEATING AND COOLING (USHC) SYSTEM

RELATED APPLICATIONS

This application claims the benefit of U.S. Provisional Application No. 61/438,831, filed Feb. 2, 2011, which application is hereby incorporated by reference.

INTRODUCTION

A significant amount of energy is wasted in heating and cooling operations, particularly the heating and cooling of buildings and equipment through the inability to capture and use waste heat or waste cooling. While it has been proposed to capture waste heat by transferring heated water into the subsurface, thereby creating a warm water area in the natural aquifer, such systems have been found to be inefficient. Such systems suffer heat loss via conduction to the natural subsurface material and convective heat loss due to the natural flow of groundwater carrying heat away and mixing heated water with natural, cooler water.

Underground Storage Heating and Cooling (USHC) System

This disclosure describes systems and methods for the underground storage of heated or cooled fluid in order to preserve the temperature of the fluid. The systems described herein utilize one or more porosity storage reservoirs for heated or cooled fluid storage, in effect creating cold and or heat reservoirs in the subsurface. The reservoirs are hydrologically separated from the surrounding natural groundwater regime and, at least in part, thermally insulated from the natural environment by the walls creating the underground reservoirs. The walls may be actively or passively heated or cooled to provide better performance.

This disclosure further describes different systems and methods for efficiently utilizing the underground reservoirs in conjunction with an end user's heating and cooling systems. In one aspect, this disclosure describes a method for construction of an underground storage heating and cooling (USHC) reservoir. The method includes selecting a reservoir location for the USHC reservoir; constructing an underground porosity storage reservoir at the reservoir location, the underground porosity storage reservoir including an underground vessel defined at least in part by one or more substantially water-impermeable, man-made barriers and an aquiclude, the vessel defining a volume of subsurface material such that the volume is substantially hydrologically separate from an environment exterior to the volume; determining one or more thermal characteristics of each of a plurality of samples of material taken from different sample locations within the volume of the underground porosity storage reservoir; identifying at least two three-dimensional regions within the volume of the reservoir based on a comparison of the thermal characteristics of the plurality of samples; placing a plurality of wells at well locations and well depths within the USHC reservoir; and associating each well with one of the three-dimensional regions.

In the method, selecting a reservoir location may include characterizing physical and thermal characteristics of subsurface materials at a plurality of potential reservoir locations and selecting the reservoir location from the plurality of potential reservoir locations based at least in part on a comparison of the physical and thermal characteristics of the subsurface materials. The method may also include constructing one or more substantially water-impermeable, man-made subsurface barriers having an R value of greater than 0.05 ($ft^2$ h ° F./Btu in).

In another aspect, the disclosure describes a method of operating an underground storage heating and cooling (USHC) reservoir. In this aspect, the method includes determining a current temperature at each of a plurality of wellpoints within the USHC reservoir, in which each wellpoint provides access to a different location within the material in the USHC. The method also includes identifying thermal characteristics of material associated with each of the plurality of wellpoints and selecting at least one of the plurality of wellpoints for extraction or introduction of water based on the thermal characteristics and current temperature of water associated with the at least one wellpoint. The method may further include determining a desired heat load associated with the extraction or introduction of water and selecting the wellpoints further based on the desired heat load associated with the extraction or introduction of water. The method may also include monitoring an ambient environment temperature external to the USHC reservoir; comparing the ambient environment temperature to the current temperature at one or more wellpoints within the USHC; and exchanging heat between water associated with at least one wellpoint and the ambient environment based on the comparison of the ambient environment temperature to the current temperature.

In yet another aspect, the disclosure describes systems for energy storage. For example, one system described herein includes an underground porosity storage reservoir containing at least some water, the underground porosity storage reservoir including an underground vessel defined at least in part by one or more substantially water-impermeable, man-made barriers and an aquiclude, in which the vessel defines a volume of subsurface material such that the volume is substantially hydrologically separate from an environment exterior to the volume. The system further includes a plurality of wells providing access to locations within the underground porosity storage reservoir, in which each location is associated with one or more known thermal characteristics specific to that location and previously determined via testing of material from the location. The system may further include temperature sensors monitoring water temperature at one or more locations and a control system that selectively transfers heat to or from different wells based on current water temperature at each location and the one or more known thermal characteristics specific to each location.

Additional embodiments of the system may include an building heat transfer system adapted to transfer heat between water and a heating ventilation and air conditioning (HVAC) system associated with a building, wherein the control system further controls the heat transfer system selectively transfers heat between water from a selected one or more wells and the HVAC system associated with the building. In the system, the control system selects the one or more wells based on an energy load associated with the HVAC system, current water temperature at each location and the one or more known thermal characteristics specific to each location.

Another embodiment of the system includes an ambient heat transfer system adapted to transfer heat between water and an ambient environment. The control system may further control the heat transfer system selectively transfers heat between water from a selected one or more wells and the HVAC system associated with the building. The control system may select the one or more wells based on an energy load associated with the HVAC system, current water temperature at each location and the one or more known thermal characteristics specific to each location.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

FIGS. 4a, 4b illustrate an embodiment an active heat retention system using a closed loop solar heating system.

FIGS. 5a, 5b illustrate two alternative embodiments, respectively, of solar heat augmentation systems.

DETAILED DESCRIPTION

Although the techniques introduced above and discussed in detail below may be implemented for any system or process in which energy in the form of a temperature differential is being wasted. The reader will understand that the technology described in the context of a building waste heat and waste cooling system could be adapted for use with other systems such as a residential heating and cooling system, an industrial process system, a large server farm or computer facility cooling system or an large institutional complex such as a educational or governmental facility.

Figure 1:
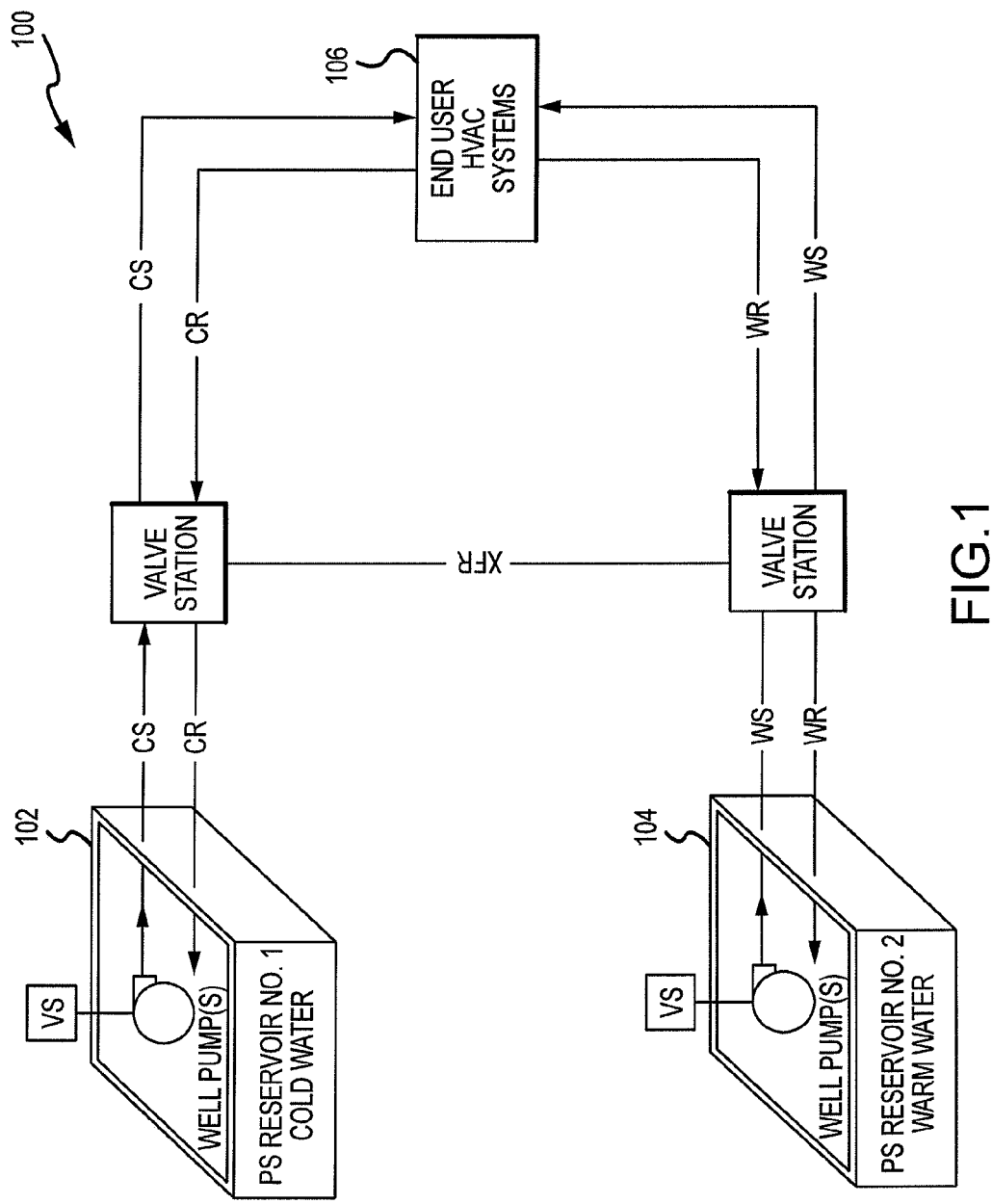
FIG. 1 is a schematic representation of an embodiment of a USHC system.

FIG. 1 is a schematic representation of an embodiment of a USHC system 100. The general system concept is based on the recovery and storage of energy in the form of sensible heat or cold rejected by the end user heating, ventilating, air conditioning (HVAC) system 106 from the conditioning of building spaces during a heating or cooling cycle and making this energy available for space heating or cooling applications. The vessel(s) used for heat storage include one or more underground porosity storage (PS) reservoirs (in the embodiment illustrated in FIG. 1, two reservoirs 102, 104 are shown). The medium for transporting heat or cold to and from storage is water or other suitable fluid, generally in the liquid state.

The sequestering of heat which is normally rejected to the atmosphere, ground, or unconfined body of water during a cooling cycle, and the reuse of this heat during a heating cycle reduces the requirement for heat input from outside sources such as fossil fuels, electricity, geothermal or solar heating. As heat is withdrawn from storage and utilized for space heating, the transporting water is cooled and stored for use in a cooling cycle, thereby reducing the need for refrigeration, evaporative cooling, or geothermal cooling for heat removal.

In the embodiment shown in FIG. 1, separate reservoirs 102, 104 are used for storage of cold water (in reservoir 102) and warm water (in reservoir 104). In alternative embodiments, multiple reservoirs could be used for either or both of cold water storage and warm water storage. In yet another embodiment, only a single reservoir could be used, such as in embodiment when only one type of water, warm or cold, is to be stored or when the other type of water is stored in some other manner (e.g., in an open underground reservoir, etc.).

Storage reservoirs 102, 104 may be sized based on historical seasonal demands for heating and cooling. Each reservoir pair is preferably sized to supply the full heating or cooling requirements for a normal year, based on whichever requirement is larger, plus additional contingency capacity for peak years. This sizing criterion maximizes the capture of heat during warm weather and the capture of absence of heat in cool weather.

In the embodiment shown, the USHC system 100 functions as a closed circuit system with energy consumption concentrated on, but not limited to, transporting heat as opposed to generating heat. The transporting medium is also conserved when compared to processes such as cooling towers which rely on evaporative phase change and convection for temperature reduction.

Although the descriptions herein refer mainly to commercial or industrial building applications, the concept of the USHC system is not limited to space heating and cooling. It may be applicable to other cyclic heating and cooling processes where water source equipment is feasible. Depending on application temperature parameters, the USHC system may function as a preconditioning process or as an augmentation system to the primary heating and cooling systems.

End User Heating, Ventilating, Air Conditioning (HVAC) Systems

End use HVAC systems vary greatly from both the equipment and configuration standpoints. This is due to a wide range of climate conditions, building configurations, occupancy scheduling, energy efficiency and building codes, and other site specific variables. In large structures it is common to encounter simultaneous demands for heating and cooling in different sectors. One method to accommodate these simultaneous demands when employing a USHC system is through the use of equalization tanks at the points of interface between the USHC cold and warm water transport pipes and the HVAC equipment.

Figure 2:
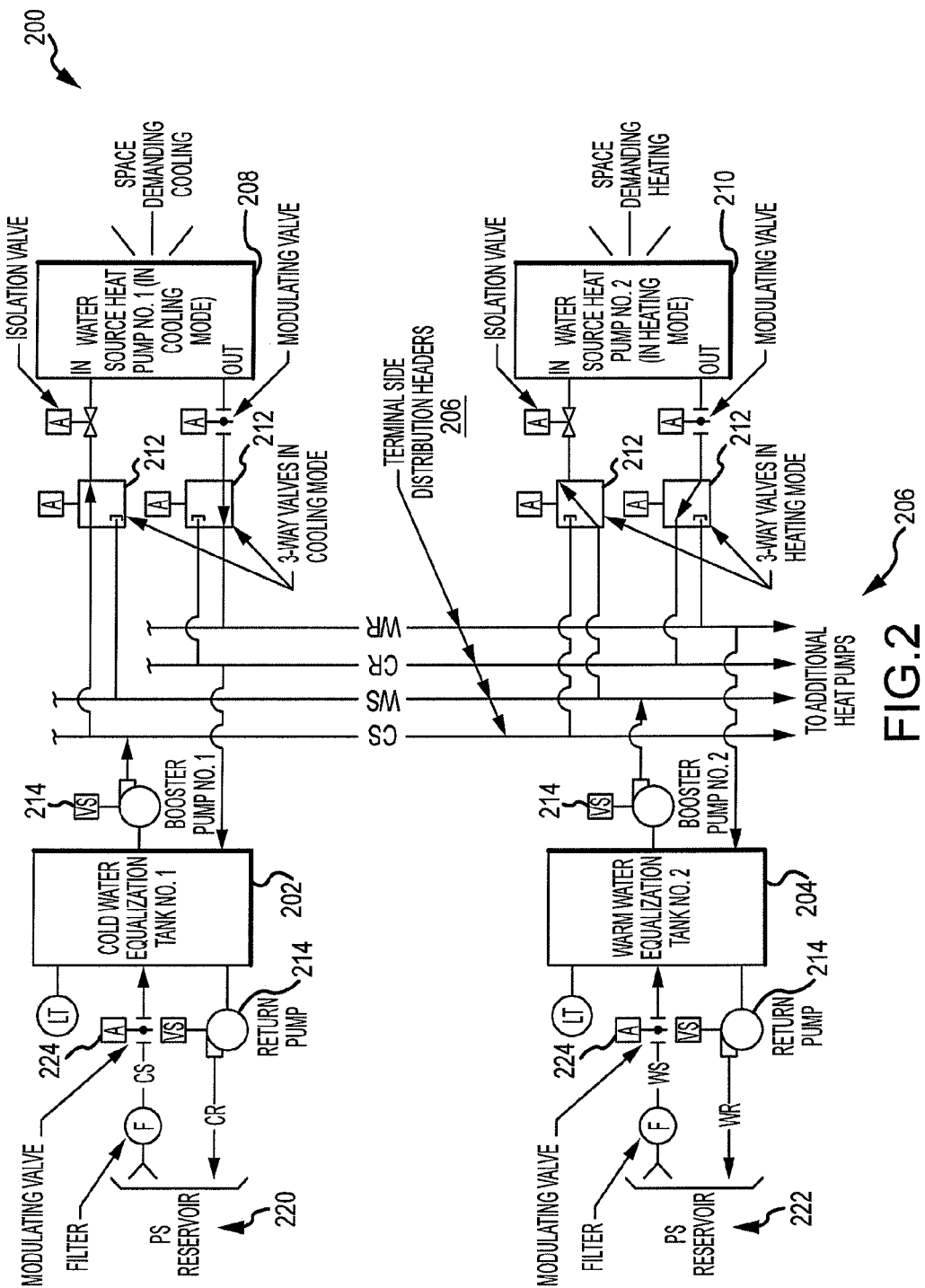
FIG. 2 illustrates a USHC end user HVAC system with separate cold and warm water equalization tanks connected to separate cold and warm water supply and return side headers on the terminal side.

FIG. 2 illustrates a USHC end user HVAC system 200 with separate cold and warm water equalization tanks 202, 204 connected to separate cold and warm water supply and return side headers 206 on the terminal side. Distributed water source heat pumps 208, 210 are shown tapped to the headers 206 through 3-way valves 212 piped so as to connect the heat pumps to the correct headers for heating and cooling modes. The variable speed booster pumps 214 maintain constant pressure in their respective supply headers.

For this example, when the overall served building requires more heating than cooling, The HVAC system 200 operates in a heating dominant mode. Conversely when the building requires more cooling than heating, the HVAC system 200 operates in a cooling dominant mode. When the heating requirement matches the cooling requirement from a volumetric water flow standpoint, the HVAC system 200 is in equilibrium.

For the following description, consider the system 200 to be in equilibrium. Heat Pump No. 1 (208) withdraws cold water from the CS header, removes heat from the served space and rejects the heat to the source water stream which raises the water temperature. This warm water is directed to the WR header and returned to Equalization Tank No. 2 (204). Heat Pump No. 2 (210) withdraws warm water from the WS header, removes heat from the source water and transfers it to the served space which reduces the water temperature. This cooled water is directed to the CR header and returned to Equalization Tank No. 1 (202). Since the heating and cooling water flow rates are equal, no supply or return from the respective reservoirs is required to maintain acceptable water levels in the equalization tanks 202, 204.

Now, consider the system 200 to be in heating dominant mode. The space served by Heat Pump No. 1 (208) swings from cooling demand to heating demand. The heat pump controls reverse the internal heat pump refrigeration cycle and shift the supply and return 3-way valves so Heat Pump No. 1 (208) operates similar to Heat Pump No. 2 (210) as shown. Both heat pumps 208, 210 withdraw warm water from Equalization Tank No. 2 (204) and return cooled water to Equalization Tank No. 1 (202) resulting in a surplus of water in Tank No. 1 (202) and a deficit in Tank No. 2 (204). The tank level control system automatically releases surplus cold water from Tank No. 1 (202) to PS Cold Water Reservoir 220 and automatically replenishes warm water to Tank No. 2 from PS Warm Water Reservoir 222.

Now, consider the system to be in cooling dominant mode. The space served by Heat Pump No. 2 (210) swings from heating demand to cooling demand. The heat pump controls reverse the internal heat pump refrigeration cycle and shift the supply and return 3-way valves 212 so Heat Pump No. 2 (210) operates similar to Heat Pump No. 1 (208) as shown. Both heat pumps 208, 210 withdraw cold water from Equalization Tank No. 1 (202) and return heated water to Equalization Tank No. 2 (204) which results in a surplus of water in Tank No. 2 (204) and a deficit in Tank No. 1 (202). The tank level control system automatically releases surplus warm water from Tank No. 2 (204) to PS Warm Water Reservoir 222 and automatically replenishes cold water to Tank No. 1 (202) from PS Cold Water Reservoir 220.

For clarity, the heat pumps 208, 210 shown in FIG. 2 and discussed herein are shown as single units supplied from either the warm or cold equalization tank 202, 204 and returning water to the opposite tank. In actual applications, it may be necessary to recycle return water to the same tank from which it is supplied or for multiple heat pumps to be connected in series to obtain the desired supply to return temperature differential. Once this desired differential is attained, the return water can be directed to the opposite equalization tank from which it was supplied.

Modulating controls are used to dynamically maintain acceptable operating levels in each equalization tank 202, 204. In FIG. 2, the devices are shown as a modulating valve 224 on the tank inlet and a variable speed pump 214 on the outlet. The exact types of devices required will depend on the specific head conditions and configuration of the installation. Here, and in general with respect to any portion of the systems described herein related to the transfer of fluid between unit processes, any suitable equipment and means for transferring fluid, now know or later developed, may be used depending on the needs of the operator.

The concept of separate warm and cold water equalization tanks 202, 204 and piping systems improves heat recovery processes over conventional systems which utilize blending or mixing of warm and cold water streams. This mixing compromises temperature differential between streams and requires additional compressor work to obtain a given output capacity. The effectiveness of the separate equalization tanks can be enhanced by insulating the tanks and/or adding auxiliary tank heating or cooling systems.

The quantity of heat pumps 208, 210 is expandable as limited by the capacity of the warm and cold water supply and the piping system. The type of terminal devices is not limited to heat pumps. Other types of water source devices may be used in a similar manner as described for heat pumps. Examples of such devices include water-to-air heating or cooling coils, imbedded radiant hot water floor heating systems, and water cooled unit air conditioners. Further, all devices employed do not need to be of the same type.

The USHC system described herein also is not limited to use with distributed terminal equipment. Centralized equipment such as water source chillers or heaters can be adapted for use where the USHC system functions as the primary water source and return loop.

Multiple End User Systems

Figure 3:
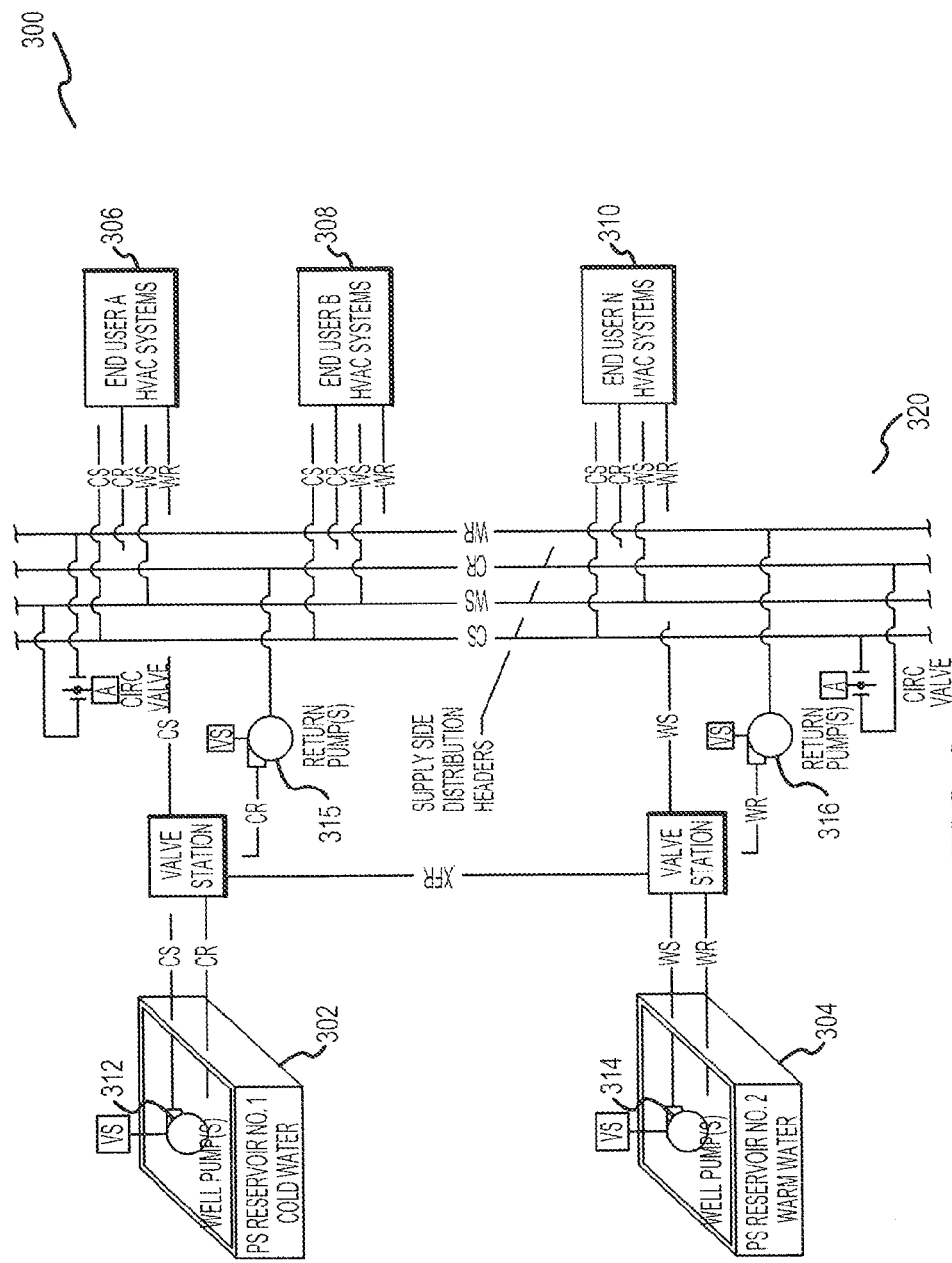
FIG. 3 is a schematic representation of an alternative embodiment of a USHC system in which a pair of cold and warm reservoirs supply heating and cooling water to multiple end user facilities.

FIG. 3 is a schematic representation of an alternative embodiment of a USHC system 300 in which a pair of cold and warm reservoirs 302, 304 supply heating and cooling water to multiple end user facilities 306, 308, 310. Such a system 300 may, for example, be suitable for use when the end user facilities 306, 308, 310 are in a compact geographical area such an educational institution campus, commercial building campus, health care campus, retail center, multifamily housing, lodging facilities, industrial complex, transportation hub or a mix of various use facilities. From a reservoir standpoint, economy of scale encourages large implementations.

In the multiple end user system 300, the system described with respect to FIG. 2, above, represents an embodiment of how any one of the individual end user HVAC systems may be implemented. The supply side piping is configured with cold and warm water supply and return headers 320 in linear or loop configurations, to which each facility is tapped. The headers are located in close proximity to the facilities served in the most economically feasible piping configuration. The reservoirs, pumps, and headers may be sized to appear as having infinite supply and return capacity to the users.

The well pumps 312, 314 in each reservoir function to maintain a constant pressure in the respective cold and warm supply headers 320. As end user demand varies, the speed of the pumps 312, 314 may be dynamically modulated to maintain a constant setpoint pressure in the headers. In this manner, the volumetric flow of the well pumps 312, 314 is matched to the combined instantaneous volumetric end user supply demands. Alternatively, surge storage may be provided so that constant speed well pumps 312, 314 could be used instead of variable speed well pumps.

The return pumps 315, 316 feeding each reservoir 302, 304 function to provide the head necessary to lift the return water back into the respective reservoirs and overcome static head at the points of discharge. The speed of the return pumps may be dynamically modulated to maintain a low pressure set point in the return header. In this manner, the volumetric flow of the return pumps 315, 316 is matched to the combined instantaneous volumetric end user return demands.

Reservoirs

Reservoirs employed for warm and cold water containment underground are constructed using porosity storage technology wherein the stored water occupies the natural void spaces. Depending on the porosity of the subsurface materials, a substantial portion of the volume of the subsurface may be available for fluid storage. For example, some natural deposits such as alluvial sand and gravel formations, may have an effective void space of 20-35% of the volume. U.S. Pat. No. 6,840,710 (the '710 patent) provides a description of an embodiment of a porosity storage reservoir suitable for use in the USHC systems described herein. The '710 patent is hereby incorporated herein by reference as but one example of how an underground storage reservoir may be engineered.

PS reservoirs are at least partially separated from the natural groundwater regime by manmade walls, such as slurry walls, or a combination of manmade and naturally occurring impervious lateral boundaries. In an embodiment, these walls extend to the bedrock or other impervious or reduced porosity layer which acts as the bottom of the vessel bounded by the walls and/or natural lateral boundaries.

A reservoir constructed in an actively flowing underground water environment is naturally suited for cold water storage since the temperature of the reservoir walls and its contents will tend to equalize with the surroundings. This results in stored water temperatures close to the temperature of the native ground water, subject to the influences of reservoir filling cycles. For example, for the heat pump cooling applications, the manufacturers' temperature range of source water may be about 40° F.-120° F. with an anticipated USHC storage range of 40° F.-70° F. For heat pump heating applications the range may be about 60° F.-90° F. with an anticipated storage range of 65° F.-95° F. For water-to-water heat pump heating applications the upper range could be around 130° F.

A reservoir constructed in an actively flowing underground water environment is less suited for warm water storage, unless located in a natural geothermal heated area. The temperature of the water introduced in a filling cycle will generally be higher than that of the native ground water since it has been warmed by a building cooling cycle. Although not mandatory, measures to improve the heat retention capability of a reservoir and thus improve efficiency of building heating may be desirable.

Active reservoir heat retention methods involve the addition of heat to the reservoir from outside sources. Passive heat retention methods involve measures to alter the inherent thermal properties of the reservoir. Either or both of these methods may be employed on a given installation.

Reservoir Active Heat Retention and Augmentation

FIG. 4 is an illustration of an embodiment an active heat retention system 400 using a closed loop solar heating system. The concept involves circulating a solar heated fluid through pipes 404 imbedded in the wall 406 of a PS reservoir and the transfer of heat to the wall 406. A similar wall heating method using imbedded electric heating cables in place of, or in addition to, circulating fluid pipes could also be used.

In the embodiment shown, the closed loop solar heating system comprises a solar hot water array 410, piping 404, a circulation pump 412, and an expansion tank 414. The solar hot water array 410 may be of any suitable type including, for example, a parabolic mirror solar collection array. Many solar arrays for heating fluids are known in the art and any suitable array, now known or later developed may be used. The piping 404 also may be of any material and type known in the art. In the embodiment shown, the wall 406 is provided with a buried box 416 which houses and provided to pipe joints and potentially any other equipment associated with the system 400 such as valves and controllers and an electronic control system 420 for the heating system. In an embodiment, such a box 416 could be as simple as an irrigation valve boxes or electrical pull boxes, i.e., a subsurface chamber that allows only hand access or handholes. However, depending on the needs of the system, a buried box 416 could be substantially larger, e.g., a below grade valve vault would be more on the order of a larger concrete vault with a manhole or hatch type entry.

A temperature sensor 422 is also shown in the reservoir 406. Such temperature sensors may be of any type known in the art. Depending on the needs of the operator, it is anticipated that any of the technologies described herein would include multiple temperature sensors located throughout various streams and parts of the system in order to provide sufficient knowledge in real-time about the various temperatures to allow the one or more controllers 420 to efficiently control the transfer of heat throughout the system.

Since heat transfer is a function of temperature differential, raising the wall temperature impedes heat transfer from the contained warm water to the reservoir surroundings through the walls. If the wall temperature can be increased to equal the contained water temperature, the heat transfer through the wall will approach zero. If the wall temperature exceeds the contained water temperature, a boost in water temperature will be accomplished.

By using solar photovoltaic (PV) power generation 418 to operate the circulation pump 412, net conventional energy consumption can be minimized. Since there is no requirement for circulation unless solar water heating can occur, the PV electrical storage system can be minimized. Temperature monitoring of the circulating fluid and/or PV production are used to control the circulation pump 412 operation. In an alternative embodiment, PV power generation could also be used for powering electric heating cables.

The circulation piping 404 imbedded in the wall 406 is shown as loops of pipe with accessible ends which may be connected in series (as shown) or in parallel. Accessible piping allows flexibility of system configuration and segment isolation. The quantity of loops and loop lengths can be set to maximize heat transfer and the direction of flow through the loops can be reversed to promote heating uniformity.

Solar heating may also be utilized for raising the temperature of the WR water stream returning to the warm water reservoir and/or the WS stream leaving the warm water reservoir.

FIG. 5 illustrates two alternative embodiments of solar heat augmentation systems. In one embodiment 500*a*, a solar hot water array 502 is used to provide heated fluid to a heat exchanger 504 that heats a WR water stream 506 returning to the warm water reservoir. In the other embodiment 500*b*, the heat exchanger 504 transfers heat to a side stream 508 of the WR water stream 506; the side stream 508 being later recombined with the WR water stream 506. Depending on scale, it may or may not be practical to route the entire WR or WS stream through a heat exchanger as shown in the full stream heating example. Alternately, side stream heating may be employed wherein a portion of the main stream is heated and returned to the main stream where blending occurs increasing the total stream temperature.

Solar hot water heating is illustrated as the source of heat in the examples shown in FIGS. 4 and 5 because of its advantage of low energy consumption. However, alternative sources of heat such as fossil fuel fired heating appliances, geothermal heating, electric heating, or heat pumps may also be employed in the heat exchanger loops.

Figure 7:
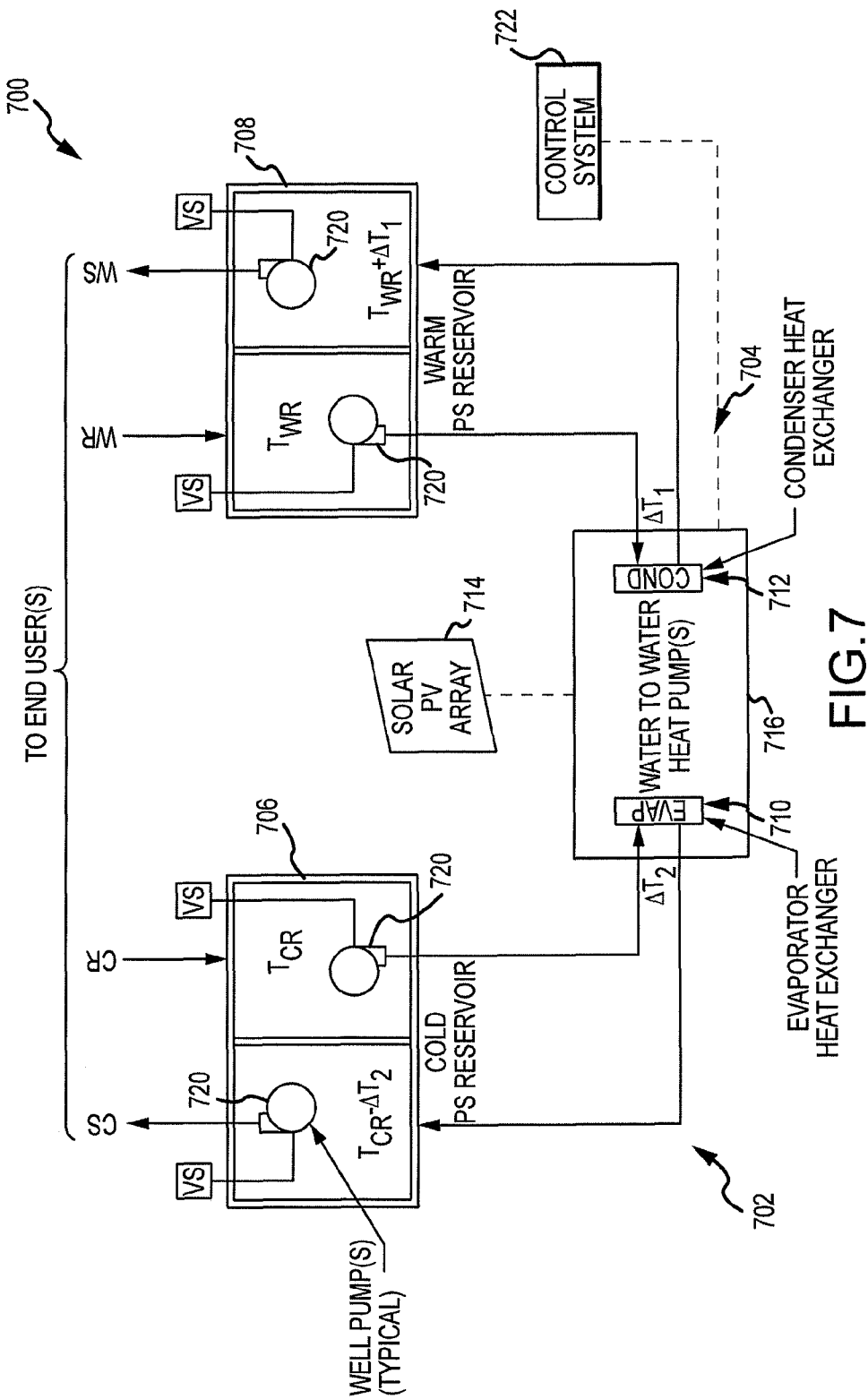
FIG. 7 illustrates an embodiment of a configuration of water-to-water heat pumps for simultaneous heating and cooling augmentation.

FIG. 7 illustrates an embodiment of a configuration 700 of water-to-water heat pumps for simultaneous heating and cooling augmentation. In this configuration 700, water from the cold reservoir 706 is actively cooled by an evaporative cooling system 710 and water from the warm reservoir is heated via a condenser heat exchanger 712. In the embodiment shown, the evaporative cooling system 710 and the condenser heat exchanger 712 are solar powered by a solar PV array 714 and combined into an integrated heat pump system 716.

The evaporator water loop 702 and condenser water loop 704 may be direct coupled to the respective reservoirs 706, 708, without the use of heat exchangers, to increase efficiency. This configuration 700 may allow the use of the same variable speed well pumps (not shown) used for end user supply to function as the circulating pumps for the augmentation system. The system may be operated on a continuous basis at modest flow rates to provide significant reservoir water temperature changes over time. Continuous operation offers the advantages of reduced heat pump capacity and electrical peak demand. Additionally, the use of alternative energy sources, such as solar photovoltaic generation as shown, or combined heat and power systems such as an on-site engine generator with heat recovery will reduce conventional energy consumption. Water-to-water heat pumps may be of particular value for the initial charging of warm water reservoirs since some heat will be transferred from the water to the natural reservoir materials until an equilibrium temperature is reached.

Water-to-water heat pump temperature augmentation as described above may be used to condition stored warm and cold water to temperatures which allow direct application to heating and cooling coil type devices to the extent that building mechanical equipment capacities can be significantly reduced or eliminated entirely except for backup purposes. This type of implementation will reduce in-building heating and cooling system complexity, energy consumption, noise, and maintenance.

FIG. 7 also illustrates the use of subdivided warm and cold water reservoirs 706, 708 which may be employed to help maintain the temperature differentials achieved by the heat pumps. Construction of the divided reservoirs is similar to the Siamese reservoir shown in FIG. 6, discussed below, however the compartments need not be of the same size.

Reservoir Passive Heat Retention

Passive heat retention methods deal with improving the thermal characteristics of the reservoir containment components, i.e. the base, walls, and top of the reservoir. Since the base is generally a bedrock or other aquiclude, little can be done to alter its heat transfer properties without large scale excavation. However, the contained water near the base will exhibit temperature stratification (which will be a function of the thermal conductivity of the porous material) and benefit can be realized by maximizing withdrawal from the warmer zones within the reservoir and avoiding the cooler zones near the reservoir boundaries. Reservoirs may be designed and operated with separate warm and cold extraction and injection wells in order to maintain the temperature stratification within the reservoir. In situations where the porous material is sufficiently insulative and the reservoir sufficiently deep, the cold reservoir may be a lower stratum of the same reservoir that contains the warm reservoir (at a higher stratum). Thus, cold water extraction and injection wells could be located at the bottom of the reservoir and warm water extraction and injection wells located at a shallower depth.

The top of the reservoir consists generally of natural soil formations. As described in detail in the '710 patent, one benefit of using an underground reservoir is minimal disturbance of the existing surface uses, potentially allowing construction of a reservoir beneath existing facilities such as buildings, parking lots, parks, and recreational facilities, for example. Similar to the base, it is anticipated that little can be done to alter its heat transfer properties without large scale excavation. However, depending on the nature of the site, a surface cap or other structure of some kind could be provided specifically to insulate the reservoir from the environment above the reservoir. In addition, if the design capacity of the reservoir can be achieved by filling the reservoir to less that its maximum level, a dry zone will exist in the upper deposits which will offer some heat retention benefit. Furthermore, if the surface is exposed to sunlight, any such cap could be designed as a passive or active solar collector for transferring heat to the warm water reservoir. For example, a passive system could be created by making the surface of the cap a black metal plate connected to metal or other passively heat-conducting rods that penetrate into the reservoir. Solar heating of the exposed black metal would then cause heating of the subsurface passively. Likewise, a passive system for cooling the cold water reservoir could be created using evaporation of water over an exposed metal plate at the surface or exposed to the ambient air (but possibly out of the sun) that is likewise connected by heat-conducting metal rods to the interior of the cold water reservoir.

The walls, such as those shown in FIG. 4 and the '710 patent are generally the only constructed boundaries of a PS reservoir. Therefore implementing measures to impede heat transfer through the reservoir walls may be practical from a construction standpoint. Based on one reference, the R value (in $ft^2$ h ° F./Btu) of 1-inch thickness of a 60-pound-per-cubic-foot mix of concrete is 0.52 whereas natural granite is reported as 0.08 and natural sandstone/limestone is 0.05. So such a concrete without additional alteration will provide better insulation than these natural materials. However, the use of insulating materials with low thermal conductivity coefficients will enhance heat retention. Such materials could be incorporated into the constructed boundaries or into the composition used to create the boundaries. For example, insulating foam particles, a foaming agent to increase the air content or other insulating particles could be incorporated into the slurry wall mixture so that foam is distributed throughout the resulting reservoir walls. Alternatively, insulating materials could be inserted into trenches before the slurry hardens, such as foam sheets. Where possible, an R value of greater than about 0.05 ($ft^2$ h ° F./Btu in) and more preferably greater than (0.10 $ft^2$ h ° F./Btu in) is desired.

Figure 6A:
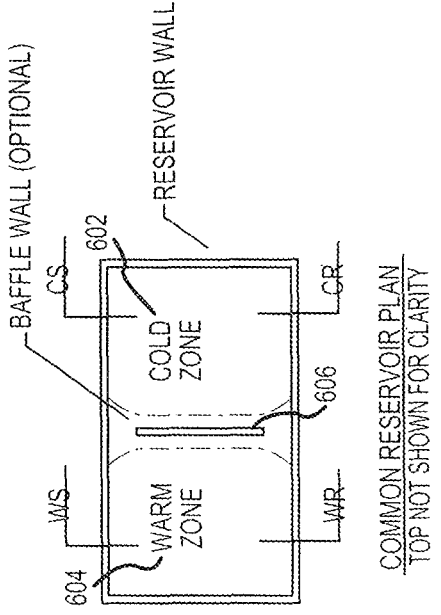
FIGS. 6a, 6b, and 6c illustrate three embodiments of different underground storage reservoir geometries.
Figure 6B:
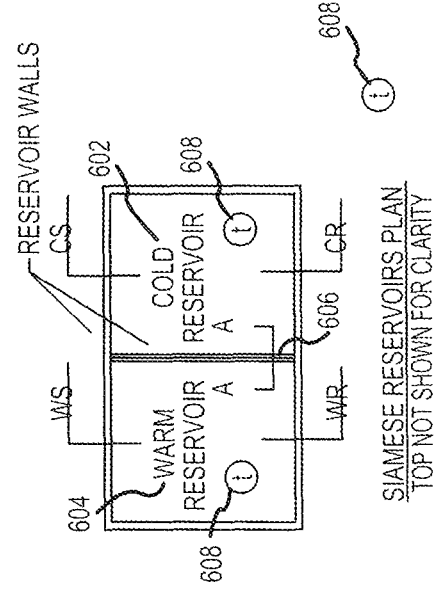
Figure 6C:
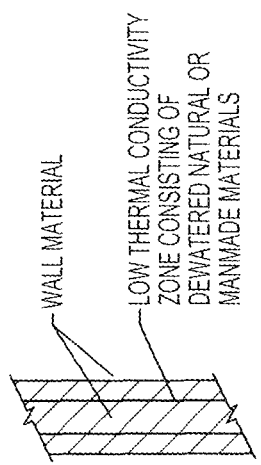

Sandwich wall construction can be employed wherein insulating material resides between inner and outer layers of the wall material as shown in FIG. 6. In an embodiment, two concentric slurry walls could be constructed separated by an insulating zone. Such a zone could be made insulating by injecting the zone with an insulating grout or other insulating material or fluid. Alternatively, such a zone could be made insulating by dewatering the zone, thereby filing it with air for use as the insulating material. Characteristics could be further improved by circulating air as at specified temperature through this zone (e.g., providing heated or ambient air into the insulating zone around the hot reservoir and chilled or ambient air into the zone around the cold reservoir).

The use of ambient air could be varied based on the seasons, e.g., using ambient air to cool the cold reservoir in winter and heat the warm reservoir in summer. In addition, in extreme environments diurnal variation of temperatures could be used to cool the cold water reservoir (directly or through the walls of the reservoir) at night and heat the warm water reservoir during the day. In either case (diurnal or seasonal), a controller and temperature sensors for the detecting the ambient air temperature and temperatures in the reservoirs could be used to direct the ambient to the appropriate reservoir based on the relative temperatures. For example, in an embodiment a predetermined threshold difference (e.g., 5 degrees F.) could be used such that when the ambient air temperature is greater than the warm reservoir temperature by the threshold amount or less than the cold water reservoir by the same or a different threshold amount, the controller would automatically direct the ambient air to the appropriate reservoir or otherwise direct the operation of the appropriate heat exchanging equipment to utilize the temperature difference for heating or cooling of the appropriate reservoir. It should be noted that direct mixing of ambient air with the stored water may not be beneficial dues to the side effect of enhancing biological activity within the reservoir. As such, alternative methods that avoid direct mixing or contact between the stored water and the ambient air is contemplated. Such could be effected by transferring the stored water to the surface and to a heat exchanger that facilitates heat transfer between the water and the ambient air. Alternatively and possibly more efficiently, ambient air could be directed to one or more heat exchanging apparatuses in the reservoirs.

Reservoir Geometry

FIG. 6 illustrates several embodiments of different reservoir geometries. PS reservoir geometry is influenced by many factors including but not limited to legal boundaries, underground stratigraphy, deposit characteristics, and storage capacity requirements. In the technologies described herein, factors such as proximity to the end user HVAC systems and thermal issues will likely be important. Each reservoir may be designed to make best use of the existing natural geological conditions within the constraints of the available land surface area, volumetric storage requirements, proximity to end user HVAC systems and costs. In general, the FIGS. included herein illustrate reservoirs as rectangular forms however; actual reservoirs are not limited to rectilinear shapes and can be any two-dimensional or three-dimensional shape that the operator deems appropriate, e.g., circular, following a property or natural boundary, etc.

One advantageous configuration for USHC applications from a heat transfer prospective is two separate reservoirs for cold and warm water storage. The two reservoirs 602, 604 do not need to be in close proximity to one another and may even be located on separate land parcels. However, some economy can be realized by combining common facilities, such as valve stations and standby power systems, if the reservoirs are located on a common site.

Referring to FIG. 6 for examples of alternative reservoir configurations, Siamese reservoir construction may be used to maximize storage volume versus surface land area required. Some heat transfer will occur through the common wall 606 which will somewhat compromise the temperature differential between warm and cold reservoirs. To minimize heat transfer between reservoirs 602, 604, sandwich wall construction 610 may be employed. This provides a thermal break between layers of higher thermal conductivity wall material. As described above, multiple temperature sensors 608 may be distributed about the system, with FIG. 6 illustrating one sensor 608 in each reservoir 602, 604 and an ambient air temperature sensor 608.

Common reservoir construction may also be used to minimize reservoir footprint per unit volume. This construction offers cost savings but may further compromise temperature differential over a Siamese configuration. A common reservoir relies on temperature stratification for separation of warm and cold zones. Temperature stratification is more evident in low velocity, low turbulence environments. Features such as baffle walls may be employed to reduce mixing of warm and cold water.

Reservoir Pumps

Reservoir pumps, such as the pumps 720 illustrated in FIGS. 1 and 7, are generally conventional well pumps driven by electric motors or prime mover engines. The pumps may be of the submersible or vertical turbine types, both utilizing conventional well casing techniques. In some applications the same pump(s) may be used for both withdrawal from the reservoir and injection into the reservoir. Reservoir water instrumentation may be included in well facilities utilizing the well casings for installation of devices such as level, temperature, and analytical transducers.

The pumps are sized and selected based on the design parameters of the specific installation. Multiple pumps may be employed to accommodate system flow turn-down ratio requirements and to provide redundancy for service continuity during equipment failures and maintenance shutdowns. Multiple pumps may also be required to accommodate reservoir configurations and characteristics. One or more small jockey pumps may be installed to provide more precise control and more efficient operation during low flow periods.

In addition to specific lateral pump location the across the top of a reservoir, the vertical placement of the intake for water withdrawal from a reservoir, and vertical placement of discharge for water injection into a reservoir need to be designed to take advantage of the natural thermal characteristics of a reservoir and the natural temperature gradients within a body of water.

Pumps are normally equipped with variable speed controllers but may be constant speed or multi-speed or a combination of variable and constant/multi-speed depending on the individual system requirements. Variable speed controllers provide more precise process control capability as well as inherent energy savings and reversing capability.

Standby power systems(s) may be installed as backup to the normal power sources for pumps, controls, and auxiliary systems to provide continuity of service when normal power is interrupted. One or more standby engine generators may be employed as backup to electric utility power service(s). The standby power source interfaces with the utility power source through an automatic or manual transfer device which provides isolation between sources and, if an automatic device is employed, it provides unattended generator control and load transfer. Standby power systems may be sized and configured to backup total or partial system load. Standby generators may also be configured as co-generation for peak load shedding to take advantage of available utility rate structures. During generator operation, heat recovered from engine cooling, exhaust, and turbocharger(s) can be applied to reservoir water heating through appropriate heat exchangers.

In many USHC systems, the pumps will be a large energy consumer. Since the reservoir footprints represent a significant land area, the implementation of a solar photovoltaic co-generation system may be feasible to take advantage of the available land and provide a portion of the power for operation of pumps and auxiliary equipment or for direct sale back to the utility.

Reservoir Valve Stations and Piping Systems

Valve station(s) in the form of a below grade vault, such as the buried box 416 shown in FIG. 4, above grade building, exposed outdoor installation, or a combination thereof may be provided and configured to suit the individual system requirements. A valve station facility provides for geographical consolidation of valves and other equipment and, in the case of a vault or a building, protection from the elements and unauthorized tampering or vandalism.

Valve functions may include isolation, flow directional control, pressure control, flow rate control, air release, and specialty valves as required by the specific installation. Stations may also house electrical distribution and control equipment, water quality sampling and analysis equipment, chemical storage and feed equipment, process instrumentation, communications equipment, heat exchangers, components requiring maintenance or operator attendance, and components which benefit from a controlled environment.

The piping systems used for transporting the cold and warm water streams generally comply with industry standards for commercial and municipal water systems. Piping sizes, ratings, and materials of construction are selected on a project specific basis to meet the pressure, flow, and installation parameters of the project. Inclusion of piping insulation and heat augmentation systems such as heat tracing may be included to enhance performance.

Underground piping represents a significant opportunity for heat exchange between the transported water and the surrounding soil, a function exploited in ground source and bore hole geothermal applications. In most USHC applications, buried cold water piping without insulation will benefit from the ground cooling potential while buried warm water piping will benefit from pipe insulation to minimize the effects of ground cooling during transport.

Water Quality Control

Procuring and maintaining a supply of water of satisfactory quality is essential to the successful operation of a USHC system. The main quality criteria deal with assuring the water used as the transport medium is not detrimental to the health of the reservoirs or to the operation or longevity of the equipment involved. While the reservoirs themselves may offer some water purification benefits, it may be desirable to minimize biological growth and particulate contamination of the geologic strata through preventative techniques. On the utilization side, the water should be of a quality which will not foul the equipment through the buildup of scale or deposits which cause degradation of performance, excessive maintenance, or failure of equipment. Further the water should have low particulate content and be chemically compatible with the materials with which it comes in contact and not cause excessive corrosion or erosion. That said, water quality should be easier to maintain than in systems which rely on evaporative cooling or steam generation, both of which tend to create fouling issues due to the change of water chemistry during those processes.

Water sampling and analysis, including temperature analysis, may be performed continuously, at intervals or some of each. The results of the analysis will help determine what, if any, treatment is required to correct detrimental properties of the water. Conventional water treatment techniques involving filtration and/or dosage controlled chemical additions may be employed. Processes such as exposure to ultraviolet light sources and/or application of oxidizing agents may be employed for disinfection of the water to control biological growth. Sampling and treatment may be performed at the reservoir facilities, end user facilities, or both. Water treatment processes may be implemented through process control automation or manually by an operator or a combination thereof. Water quality and treatment data may be shared bilaterally with the building management systems through automation networks to optimize performance and control costs.

An ante reservoir or tank may be used to receive and hold return water prior to injection into the main reservoir. The ante containment provides a facility for flow equalization, water analysis, treatment, contact time or, if necessary, disposal, thus minimizing the opportunity of main reservoir contamination.

Water exchange may be a viable option for maintaining acceptable water quality subject to water rights and applicable regulations. Water exchange involves trading water previously used in a USHC application for fresh make-up water. The exchange would be best accomplished at the cold water reservoir end where the return cold water temperature and make-up water temperature would be similar. The exchange may involve the total volume of transport water in the system or a partial volume. Further the exchange could be based on a single batch, multiple batches at intervals, or continuous exchange.

The logistics of the exchange process would involve discharging cold water from the cold reservoir or discharging return cold water prior to injection into the reservoir to a designated waterway or conduit. Fresh cold water would be introduced to recharge the reservoir from a designated source and in a like volume to the discharge. Additional pumping may be required to execute water exchange and therefore an analysis would need to be performed to justify an exchange.

Instrumentation and Control Systems

A comprehensive instrumentation and control (I&C) system is essential to the successful overall operation of a USHC system. Such systems are illustrated in various FIGS. such as FIGS. 4 and 7. Since the facilities will be largely unmanned, the I&C system will automatically perform the functions associated with pump and valve control, system monitoring and alarm, and aforementioned water quality control based on data acquired from process variable transmitters and analyzers, local or remote operator interaction, and interface with end user HVAC control systems as required. The I&C system will be programmable and scalable to facilitate modifications and expansion of the USHC system. The I&C system may also include communication capability for remote monitoring and alarm notification.

Heating and Cooling Demand Imbalance

Heating and cooling demands on an entire USHC system may vary creating operating modes similar to those described for end users in paragraph. In cooler climates the USHC system may operate predominately in a heating dominate mode. Conversely, in warmer climates the USHC system may operate predominately in a cooling dominate mode. These discrepancies can create imbalances in the volumetric quantities of water required to meet demands on an annual basis.

Regions with a near balance in heating to cooling volumetric water requirements will be able to most efficiently use the reservoir storage capacities. In such installations, the warm and cold reservoirs may remain largely isolated since a similar volume of water will be moved from the cold reservoir to the warm reservoir during a cooling dominate operation as is moved from the warm reservoir to the cold reservoir during heating dominate operation. Small variations can be accommodated by slightly over-sizing reservoirs.

Warmer regions with a preponderance of cooling dominate operation will require more cold water than warm water for space conditioning on an annual basis if similar flow rates are used. This will result in a surplus of warm water and a deficit of cold water in the respective reservoirs. In a mixed multiple end user scenario, the inclusion an end user with a process heating requirement will tend to consume excess heat from the space conditioning operations thereby reducing the imbalance. If water exchange is available, the imbalance can be reduced by controlled release of warm water from the warm reservoir or warm return stream coupled with an infusion of a like volume of fresh cold water into the cold reservoir or cold supply stream. If water exchange is not available or available only on a limited basis, transfer of water from the warm reservoir to the cold reservoir can be used to offset the volumetric imbalance, see transfer lines on FIGS. 1 and 3. Cooling augmentation methods, such as air cooled coils, may be employed on the transfer stream to minimize the impact of the transfer on the cold reservoir. Cooling augmentation methods using heat rejection to the atmosphere will be particularly effective since the transfer can be conducted during cold weather.

Cooler regions with a preponderance of heating dominate operation will require more warm water than cold water for space conditioning on an annual basis if similar flow rates are used. This will result in a surplus of cold water and a deficit of warm water in the respective reservoirs. In a mixed multiple end user scenario, the inclusion an end user with a process cooling requirement will tend to augment heat from the space conditioning operations thereby reducing the imbalance. If end user heat augmentation is not available or is insufficient, transfer of water from the cold reservoir to the warm reservoir can be used to offset the volumetric imbalance, see transfer lines on FIGS. 1 and 3. Heating augmentation methods, such as shown in FIG. 5, may be employed on the transfer stream to minimize the impact of the transfer on the warm reservoir. Heating augmentation methods such as solar hot water will be particularly effective since the transfer can be conducted during warm weather with extended daylight hours.

Dissimilar warm and cold water flow rates to end users may be used to compensate for heating and cooling volumetric imbalance. For example, in heating dominate operations where surplus cold water is produced, the cold water can be supplied at a higher flow rate during cooling operations thereby increasing the volume of water returned to the warm reservoir over the course of the cooling season. Most hydronic heating and cooling equipment can operate over a range of flow rates and entering water temperatures thus enabling the system operation to be dynamically tuned to help equalize annual warm and cold water volumes. In addition to variable flow rates, compressors may be modulated on equipment utilizing vapor-compression cycles to vary output relative to a given input. These and other techniques may be used singularly or in combinations to improve volumetric balance.

Site Characterization and Siting of Reservoirs

The siting of reservoirs for a USHC may take into account additional factors than those already described in the '710 patent. Such factors specifically include those related to the ability of the reservoir to transfer heat into and out of the reservoir and to store of heat.

Because USHC reservoirs will be constructed using natural porous material such as alluvium, significant variability in the porous media between and within potential reservoir sites may be encountered. Site characterization, that is the investigation of the variability of physical, chemical, flow, heat transfer and heat storage characteristics the subsurface porous material, may be performed in order to assist with the siting, construction and operation of the reservoir. Such characteristics include permeability, porosity, density, volumetric heat capacity, specific heat capacity, thermal conductivity, mean particle size, and chemical formula. Site investigations may include a three-dimensional investigation of the subsurface volume in order to obtain a characterization map of how the properties within the site vary. In general, material with relatively high specific or volumetric heat capacity and, possibly to a lesser extent, high thermal conductivity may be identified as part of the characterization.

For example, in an embodiment a series of test bores may be drilled as part of the characterization. The materials removed during drilling may be measured for heat capacity as well as the normal geochemistry, biochemistry and hydrologic characteristics. The results may then be mapped in a three-dimensional manner and the introduction/extraction well (pickup point) may be determined from the mapping. In an alternate embodiment, the location of the wells within the USHC may be predetermined and located without testing and then the proper temperature pickup point determined through comparative runs of heat cycles. While this method may eventually meet HVAC system requirements it may not be as efficient as a field of properly tested and placed wells and screening levels.

One purpose of the characterization may be to compare and evaluate different sites for suitability for use as a warm or a cold reservoir. For example, if multiple sites are being evaluated, the characterizations of each site may determine the total amount of anticipated usable heat storage at each site based on the potential size and thermal characteristics of each site. Estimated costs of construction and/or operation may then also be used as part of the site comparison.

Figure 8:
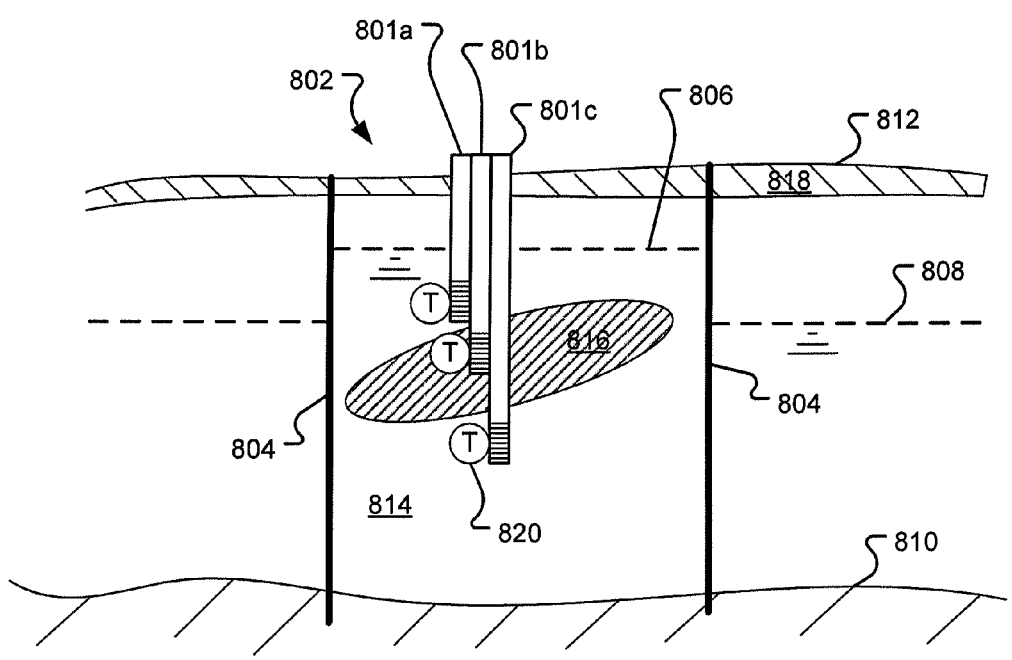
FIG. 8 illustrates a cross section of an embodiment of a reservoir illustrating one possible site characterization of specific heat capacity.

FIG. 8 illustrates a cross section of an embodiment of a reservoir illustrating one possible site characterization of specific heat capacity. In the embodiment shown, a vertical cross section of a reservoir 802 is illustrated showing the ground surface 812, the lateral walls 804 defining the lateral boundary of the reservoir 802 and the aquiclude 810 that defines the lower boundary of the reservoir. The reservoir 802 has a current water level 806 that is different from the natural groundwater level 808 outside the reservoir. In an embodiment, in order to reduce the movement of water between the reservoir and the natural groundwater regime (through leaks in the walls or the aquiclude or the junction between the two), the UCHS may be operated to maintain the water levels 806, 808 at similar or the same levels. In the embodiment shown, the walls 804 are keyed into the aquiclude 810 to reduce the leakage in order to allow for more operational flexibility in selection of water level 806 within the reservoir. In the embodiment shown, the surface 812 is a natural ground surface that includes topsoil 818 over the natural porous material 814, 816.

FIG. 8 illustrates a simplified subsurface environment in which the subsurface porous materials can be identified as two different materials 814, 816 with different characteristics (e.g., permeability, porosity, density, volumetric heat capacity, specific heat capacity, thermal conductivity, mean particle size, chemical formula, etc.). In the embodiment shown, the majority of the porous material shown is a first material 814 having a first specific heat capacity. A seam of second material 816 with different characteristics and a relatively higher heat capacity is illustrated at being contained by the reservoir walls 804. In order to take advantage of the different materials, three wells 801*a*, 801*b*, 801*c* have been located at different depths: above, within and below the seam 816. Each well is illustrated as having its own temperature sensor 820 although, as described above, other methods for determining the temperature at different locations within the reservoir may be used instead.

Given a reservoir site, characterization allows optimization of design. For example, seams of material with high specific heat capacity may be identified and their subsurface extent mapped in order to direct the siting of the reservoir walls, extraction and/or injection wells within the reservoir, and placement of equipment (both on the surface and in the subsurface). For instance, knowledge of the depth of a particularly beneficial seam of material will allow more efficient placement of wells by allowing the well screens (the part of the well casing from which the well removes water from the natural material) to be placed in the seam, below the seam and above the seam, as desired to optimize the transfer of warm or cold water. The location of a screen of a may also be referred to as a wellpoint to identify the three-dimensional point (i.e., the location and depth) to which the well via its screened portion provides access.

In an embodiment, each site may be measured and mapped to determine the site-specific heat capacity characteristics. It is anticipated that each site will be different and non-uniform in its three-dimensional heat capacity and other thermal characteristics. The water introduction and extraction systems are then designed to take advantage of the unique characteristics of each site to reduce the costs required to run the buildings HVAC system.

In this embodiment, the USHC fluid introduction and extraction systems may have specifically located points to match the site-specific heat capacity characteristics with the anticipated fluid temperature requirements of the end use. For example, there may be heat recovery points for specific temperatures (e.g., 50° F., 55° F., 60° F., 65° F., 70° F., etc.) located and plumbed for the ability to gain access to a specific temperature of fluid when called for by the buildings' HVAC system. These pickup points will not necessarily be uniform in either horizontal or vertical spacing but rely on the site-specific three-dimensional heat capacity "bubble", or three-dimensional map, for guidance as to the specific locations for desired temperature.

During operation, these "pickup points" will not always have the same temperature as the entire USHC systems' temperature will fluctuate with time and whether the USHC is in a temperature gaining or a temperature reducing state. Thus, during operation it is assumed that the actual three-dimensional temperature profile will vary based on both the site's characteristics as well as the current temperature conditions and loads being placed on the system. Because of the constantly changing state of the site-specific three-dimensional subsurface temperature profile a network of temperature monitors may be provided. These temperature monitors can then relay the real time state of the temperature in different materials within the reservoir to the decision maker (human or machine) to then determine the proper pickup points and duration of the fluid movement. Furthermore, the decision maker needs to take into account (through either design or operation) the ability of the geologic deposit, at a specific pickup point, to release the fluid at a flow rate necessary to accomplish the HVAC system demand requirements.

It should be understood that the temperature variations observed in the subsurface of an operating USHC reservoir will typically not be a simple temperature stratification based on depth, as may be observed in a traditional open water reservoir. Rather, the three-dimensional temperature map of the reservoir will be a function of many different factors including the thermal characteristics of the different material within the reservoir, the amount and location of heat added to the reservoir (or removed), the thermal conductivity of the walls and aquiclude of the reservoir, the heat lost (or gained) by the reservoir and the ambient environment temperature external to the reservoir, to name but a few factors.

Thus, such a system would operate not solely based on subsurface temperature, but based the thermal characteristics at the different locations within the reservoir. For example, some material may be at a higher temperature but have a lower specific heat capacity thereby representing less total energy available to the heating system. Based on the knowledge of how much energy is needed as well as the efficiency in transfer from the relatively higher temperature water to be obtained from this site, it may be preferential to remove water from this location than from a different location with a lower temperature but a higher specific heat capacity (thereby potentially being a larger aggregate source of energy).

Another advantage of taking fluid from temperature-specific locations during the heat withdrawal cycle is that by doing so only the required temperature of fluid is taken from the USHC thus allowing for the core of the three-dimensional heat capacity "bubble" to retain its natural shape integrity longer thus increasing overall system efficiency and lower operating cost.

In this embodiment, the fluid temperature and duration required by heat exchanger may be calculated by taking difference of the outside air temperature and the desired inside air temperature versus the actual inside air temperature and using the determined efficiency of the heat exchange method in use. Once the fluid temperature required by heat exchanger is determined, the proper fluid extraction point from the USHC is located and used. Such a calculation may also take into account any anticipated heat gains or losses from piping and transport of the water. The duration time may be determined by a feedback system to ensure the desired inside temperature has been reached. Such a method may be best used for a set inside temperature and a variable outside temperature.

The charging phase of an USHC may also take into account the site's characterization. For example, in an embodiment the charging phase of an USHC may be run on a similar temperature-dependent scenario but in a reverse fluid flow manner. The reverse fluid flow to charge the USHC simply takes the temperature "waste side" fluid flow from the heat exchanger and is directed to the proper introduction points based on the site-specific three-dimensional heat capacity "bubbles'" current temperature shape. The pickup points in the recovery phase and the introduction points during the recharge phase can be the same, but do not need to be the same.

In an embodiment, during the use of both the "cold reservoir" and the "warm reservoir" the temperature- and thermal characteristics-dependent scenario may be adhered to, in both the recovery and charging phases, as described above except when there is a fluid temperature at the extreme end of the site-specific three-dimensional heat capacity "bubbles'" current core temperature. In the case of the "cold reservoir", both the "call for" fluid and the "availability of" fluid below the core temperature, fluid flow should be "directed to" or "pulled from" only the core of the site-specific three-dimensional heat capacity "bubble". In the case of the "warm reservoir", both the "call for" fluid and the "availability of" fluid above the core temperature, fluid flow should be "directed to" or "pulled from" only the core, of the site-specific three-dimensional heat capacity "bubble".

Figure 9:
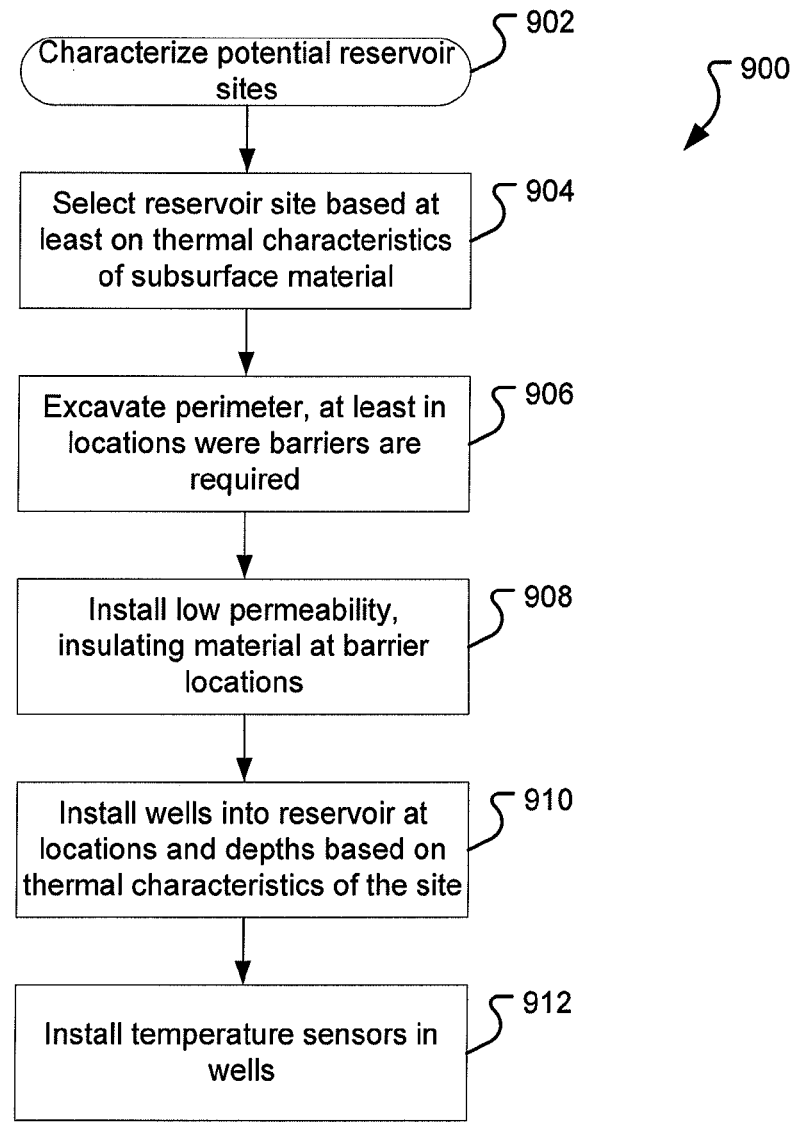
FIG. 9 illustrates an embodiment of a method for siting a USHC reservoir.

FIG. 9 illustrates an embodiment of a method for siting a USHC reservoir. In the embodiment shown, the method 900 starts with a characterization operation 902 which includes three-dimensional characterization of multiple sites for a reservoir. As described above, the characterization may include determination of one or more of various characteristics including permeability, porosity, density, volumetric heat capacity, specific heat capacity, thermal conductivity, mean particle size, and chemical formula. Site investigations may include a three-dimensional investigation of the subsurface volume in order to obtain a characterization map of how the properties within the site vary. In general, material with relatively high specific or volumetric heat capacity and, possibly to a lesser extent, high thermal conductivity may be identified as part of the characterization.

Based on the characterization data, a reservoir site or sites are then selected in a selection operation 904. Such a site selection will be made at least in part based on thermal characteristics of the subsurface material.

Construction of the reservoir is performed via an excavation operation 906 and a wall construction operation 908. In this case, walls are constructed that form both physical and thermal barriers. As described above, such a wall may be of slurry wall, pile or other construction and may or may not utilize specifically insulating materials such as foamed concrete or fill.

In a well installation operation 910 introduction and extraction wells are located and installed to the desired depths. The locations and depths are determined based on the characterization data in order to optimally provide access to the various seams of different material. For example, in an embodiment, different regions within the volume of the reservoir may be identified based on the thermal characteristics of the samples taken during the characterization of the site. The location of these regions can be mapped and then used to direct the well placement as discussed above with reference to FIG. 8. Temperature sensors are installed in a sensor installation operation 912. For example, in a simple embodiment the reservoir may be classified into two regions: a relatively high heat capacity region and a relatively low heat capacity region. In more complex embodiments, multiple regions may be defined based on relative thermal characteristics and each well then associated with one or more of the regions. Management of the transfer of heat to and from the reservoir may then be controlled taking into account the different thermal characteristics at the different locations within the reservoir.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. While various embodiments have been described for purposes of this disclosure, various changes and modifications may be made which are well within the scope of the present invention. Numerous other changes may be made which will readily suggest themselves to those skilled in the art and which are encompassed in the spirit of the disclosure.

While various embodiments have been described for purposes of this disclosure, various changes and modifications may be made which are well within the scope of the technology described herein. For example, in a predominately cold weather climate a PS reservoir may be used for the warm water reservoir while the cold water reservoir could be an aboveground storage tank or a surface water body. Numerous other changes may be made which will readily suggest themselves to those skilled in the art and which are encompassed in the spirit of the disclosure and as defined in the appended claims.

What is claimed is:

1. A method for construction of an underground storage heating and cooling (USHC) reservoir comprising;
    selecting a reservoir location for the USHC reservoir;
    constructing an underground porosity storage reservoir at the reservoir location, the underground porosity storage reservoir including an underground vessel defined at least in part by one or more substantially fluid-impermeable, man-made barriers and an aquiclude, the vessel defining a volume of subsurface material such that the volume is substantially hydrologically separate from an environment exterior to the volume;
    determining one or more thermal characteristics of each of a plurality of samples of material taken from different sample locations within the volume of the underground porosity storage reservoir;
    identifying at least two three-dimensional regions within the volume of the reservoir based on a comparison of the thermal characteristics of the plurality of samples;
    placing a plurality of wells at well locations and well depths within the USHC reservoir; and
    associating each well with one of the three-dimensional regions.

2. The method of claim 1, wherein selecting a reservoir location further comprises:
    characterizing physical and thermal characteristics of subsurface materials at a plurality of potential reservoir locations; and
    selecting the reservoir location from the plurality of potential reservoir locations based at least in part on a comparison of the physical and thermal characteristics of the subsurface materials.

3. The method of claim 1, wherein constructing further comprises:
    constructing one or more substantially fluid-impermeable, man-made subsurface barriers having an R value of greater than 0.05 (ft$^2$ h ° F./Btu in).

4. The method of claim 1, wherein determining further comprises:
    obtaining at least one sample of material from each of the plurality of sample locations within the reservoir; and
    analyzing each sample to determine one or more of a volumetric heat capacity, specific heat capacity, and thermal conductivity for the material in the sample.

5. The method of claim 1, wherein identifying regions within the reservoir further comprises:
    generating a three-dimensional map of regions within the reservoir based on the thermal characteristics of material in the plurality of samples.

6. The method of claim 1, further comprising:
    identifying a first region of relatively high heat capacity material within the reservoir and a second region of relatively low heat capacity within the reservoir.

7. The method of claim 6, further comprising:
    placing at least a first well and a second well in the reservoir at well locations and well depths determined based on the three-dimensional regions including placing the first well within the first region within the reservoir.

8. The method of claim 7, further comprising:
    placing the second well near a boundary between the first region and the second region.

* * * * *